US007097294B2

(12) United States Patent
Ishizawa et al.

(10) Patent No.: US 7,097,294 B2
(45) Date of Patent: Aug. 29, 2006

(54) LIQUID CONTAINER, LIQUID EJECTION DEVICE AND LIQUID CONTAINER CASE

(75) Inventors: Taku Ishizawa, Nagano (JP); Takeo Seino, Nagano (JP); Hitotoshi Kimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 209 days.

(21) Appl. No.: 10/786,200

(22) Filed: Feb. 25, 2004

(65) Prior Publication Data

US 2004/0218021 A1 Nov. 4, 2004

(30) Foreign Application Priority Data

Mar. 5, 2003 (JP) ........................... P2003-059020
Feb. 6, 2004 (JP) ........................... P2004-031293

(51) Int. Cl.
*B41J 2/175* (2006.01)
*G01D 11/00* (2006.01)

(52) U.S. Cl. ........................................ 347/86; 347/100

(58) Field of Classification Search .................. 347/85, 347/86, 108

See application file for complete search history.

(56) References Cited

U.S. PATENT DOCUMENTS 4,447,820 A 5/1984 Terasawa
5,710,585 A 1/1998 Sabonis et al.
6,053,606 A * 4/2000 Yamaguchi et al. .......... 347/86
6,106,112 A * 8/2000 Okubo et al. ................. 347/86

FOREIGN PATENT DOCUMENTS

DE 41 04 786 A1 9/1991
EP 0 834 403 A2 4/1998
EP 0 927 638 A2 7/1999
JP 2000-296626 A 10/2000
JP 2002-120382 A 4/2002
JP 2003-53984 A 2/2003

OTHER PUBLICATIONS

European Search Report, Application No. 04005300.1-2304-, Dated Jun. 30, 2004.

* cited by examiner

*Primary Examiner*—Anh T. N. Vo
(74) *Attorney, Agent, or Firm*—Stroock & Stroock & Lavan LLP

(57) ABSTRACT

This invention relates to a liquid container, a liquid ejection device and a liquid container case, which may effectively use a liquid stored in the liquid container, and may be reduced in size in simple constitution. An ink cartridge (11) as a liquid container includes a plurality of ink packs (12) and a container case (13) for storing the ink packs. Each ink pack (12) includes an ink outlet member (15) having an ink supply port, which is mounted on a bag part. The container case (13) has a substantially box-shaped case body part (21) and a lid case (22) covering an opening. In the ink cartridge (11), the ink packs (12) are inclined at an angle of θ to the container case (13), and the ink packs (12) are accommodated in the state of overlapping a part of the adjacent ink pack (12).

32 Claims, 6 Drawing Sheets

LIQUID CONTAINER, LIQUID EJECTION DEVICE AND LIQUID CONTAINER CASE

BACKGROUND OF THE INVENTION

This invention relates to a liquid container, a liquid ejection device and a liquid container case.

As a liquid ejection device, an ink jet printer has been known, in which ink is ejected from a nozzle to perform printing. This type of printer has been provided with a recording head having a plurality of nozzles and a carriage having the recording head with the reciprocating movement of the carriage, ink is ejected from the nozzles to perform printing. An ink cartridge storing ink supplied to the nozzles is provided in this type of printer as a replaceable liquid container.

In the case of the printer for printing a large-sized paper sheet, a large quantity of ink is used, so an ink cartridge storing a large volume of ink is needed. When such an ink cartridge is mounted on a carriage and moved, a great deal of load is applied to a driving part. Therefore, in the printer for printing a large-sized paper sheet, the ink cartridge has not been mounted on the carriage (the constitution is the so-called off carriage type).

The ink cartridge used in the off carriage type is generally made up of an ink pack storing ink and a case for storing the ink pack. In more detail, the ink pack is generally formed such that an outlet member having an ink outlet port is sandwiched between two sheets of laminated films, and the peripheries of the films are welded to each other. The case is formed of plastics or the like, and stores the ink pack with the outlet member projected outward (as disclosed, for example, in JP-A-2002-120382 and JP-A-2000-296626). As indicated in JP-A-2002-120382, generally one ink pack is stored in one case. Therefore, in the printer including ink of two or more colors, the ink cartridges are arranged corresponding to the number of the colors. Consequently, in the printer including ink of two or more colors, the space for providing the ink cartridges cannot be reduced, so it is difficult to reduce the size.

On the other hand, in the ink cartridge disclosed in JP-A-2000-296626, one ink pack having a plurality of storing parts, each for storing ink is accommodated in one case. In more detail, the ink pack disclosed in JP-A-2000-296626 is so constructed that a plurality of storing parts are defined by welding two sheets of films and ink of different colors is stored in the respective storing parts.

In the ink cartridge of JP-A-2000-296626, however, the intervals of the respective storing parts storing ink of the respective colors are determined depending on the size of the welded part. Consequently, it is difficult to further reduce the size of the ink cartridge. Since the ink of different colors is stored in one ink pack, when ink of a specified color is consumed, it is impossible to replace only the ink of that color, and the whole ink pack needs to be replaced. Therefore, the ink stored in the ink pack cannot be used effectively.

The invention has been made in the light of such circumstances and provides a liquid container, a liquid ejection device and a liquid container case, which may effectively use a liquid stored in the liquid container and may be reduced in size in simple constitution.

SUMMARY OF THE INVENTION

According to an aspect of the invention, a liquid container includes: a plurality of liquid storing bags, each having a liquid outlet member provided with a liquid outlet port and a liquid storing part formed of flexible film material; and a liquid container case having support parts for fixing the liquid outlet members to expose the liquid outlet ports to the outside. At least four liquid storing bags are disposed to be shifted from each other with, a part of the liquid storing bag overlapping a part of the adjacent liquid storing bag along the base of the liquid container case in the interior of the liquid container case. Preferably, and the space between the adjacent liquid outlet ports is gradually increased as it goes from the end in the arranging direction of the liquid outlet ports toward the center.

In this arrangement, the interior of the liquid container case can be efficiently utilized by partially overlapping arrangement of the liquid storing bags. That is, the liquid storing bags are accommodated in the liquid container case with a part of the liquid storing bag overlapping a part of the adjacent liquid storing bag. Accordingly, the liquid container can be reduced in size for that overlapping part of the liquid storing bags. Moreover, the space between the adjacent liquid outlet ports is gradually increased as it goes from the ends in the arranging direction of the liquid outlet ports toward the center, whereby the pressure applied to the adjacent liquid storing bag by each liquid storing bag can be made uniform regardless of the position of the liquid storing bag in the liquid container. As a result, the liquid stored in each liquid storing bag can be used effectively.

According to another aspect of the invention, a liquid container includes: a plurality of liquid storing bags, each having a liquid outlet member provided with a liquid outlet port and a liquid storing part formed of flexible film material; and a liquid container case having a case body provided with a base, a side wall interesting the base, support parts formed on the side wall for fixing the liquid outlet members to expose the liquid outlet ports to the outside, and an open face opposite to the base, and a lid member for sealing the open face. At least four liquid storing bags are disposed to be shifted from each other with a part of the liquid storing bag overlapping a part of the adjacent liquid storing bag along the base of the liquid container case. Preferably, the space between the adjacent liquid outlet ports is gradually increased as it goes from the ends in the arranging direction of the liquid outlet ports toward the center.

In this arrangement, the liquid storing bags are accommodated in the liquid container case with a part of the liquid storing bag overlapping a part of the adjacent liquid storing bag. Accordingly, the liquid container can be reduced in size for that overlapping part of the liquid storing bags. Moreover, in the liquid container case including the lid member sealing the open face, the space between the adjacent liquid outlet ports is gradually increased as it goes from the ends in the arranging direction of the liquid outlet ports toward the center. Thus, the pressure of each liquid storing bag applied to the adjacent liquid storing bag can be made uniform regardless of the position of the liquid storing bag in the liquid container. As a result, the liquid stored in each liquid staring bag can be effectively used.

According to another aspect of the invention, in the liquid container, each of the liquid storing bags is formed by welding four sides of two sheets of flexible films. Therefore, when the liquid is stored in the bag, the liquid storing bag is shaped like a spindle so that the central parts of the flexible films are most expanded. That is, the space between the thus formed liquid storing bag and the liquid container case near the ends of the flexible films approximates to the shape of the ends of the flexible films of the liquid storing bag. Therefore, in the space between the liquid storing bag and the liquid container case, a larger part of the adjacent liquid storing bag is positioned so that an overlap of the liquid storing bag and the adjacent liquid storing bag is increased to more effectively use the space of the liquid container case, Accordingly, the liquid container can be reduced in size, which will contribute to further reduction of size of a liquid ejection device including the liquid container.

According to another aspect of the invention, in the liquid container, the liquid container case is provided with support parts for supporting the liquid storing bags so that the central axes of the liquid outlet ports are all disposed on the same horizontal plane. In this configuration, since the central axes of the liquid outlet ports of the liquid storing bags are on the same horizontal plane, the respective liquid storing bags have the same liquid level. Accordingly, the pressure head depending on the height of the liquid level of the liquid storing bag is uniform so that the liquids supplied from the respective liquid storing bags can have the substantially same pressure.

In the liquid container, the overlapping parts of the liquid storing bags include the mutually welding parts of the flexible films. Thus, the mutually welding parts of the flexible films of the liquid storing bag, that is, the parts storing no liquid overlap the adjacent liquid storing bag in the liquid container. Accordingly, even if the liquid storing bag is rotated, the liquid storing bag causes less influence upon the adjacent liquid storing bag. Therefore, the liquid in the liquid storing bag can be almost always supplied at designated pressure.

According to another aspect of the invention, in the liquid container, a plurality of liquid storing bags are accommodated at a designated angle of inclination to the base of the liquid container case.

Thus, the plurality of liquid storing bags are accommodated at a designated angle of inclination, whereby in the space produced between the liquid storing bag and the liquid container case, the adjacent liquid storing bag can be easily disposed. Especially, in the case of the liquid storing bag shaped like a spindle formed by welding four sides of two sheets of flexible films, the spaces, which are generally produced between the liquid storing bag and the liquid container case on both sides (upper and lower sides) of the end of the liquid storing bag, can be combined as one large space by inclining the liquid storing bag. Accordingly, when the adjacent liquid storing bag is disposed in the larger space, an overlapping part between the liquid storing bag and the adjacent liquid storing bag can be enlarged so that the space in the liquid container case can be used further effectively.

According to another aspect of the invention, in the liquid container, the liquid container case is provided with an attitude holding member adapted to hold the liquid storing bag in an attitude of being inclined at a designated angle. By this arrangement, the liquid storing bag can be held in an attitude of being inclined at a designated angle by the attitude holding member. Thus, there is little possibility that before mounting on the liquid ejection device, the attitude of the liquid storing bag storing a liquid is collapsed so that the pressure of the liquid stored in the liquid storing bag is applied to another liquid storing bag to largely vary the pressure of the other liquid discharged from the liquid storing bag. That is, since the attitude of the liquid storing bag can be held, there is little possibility of exerting any influence upon the discharge pressure of the other liquid storing bag, so the liquid can be supplied substantially at designated pressure.

According to another aspect of the invention, in the liquid container, the attitude holding member is formed integral with the liquid container case. Thus, the attitude holding member is formed integral with the liquid container case, whereby the number of parts can be reduced to be inexpensive, and the attitude holding member can be always put in a designated position not to be moved. Accordingly, the liquid storing bag can be easily disposed in the liquid container.

According to another aspect of the invention, in the liquid container, a reverse insertion preventing member and/or an erroneous insertion preventing member is provided. The reverse insertion preventing member prevents the liquid container from being mounted in an attitude other than a designated attitude to a liquid ejection device for ejecting a liquid in the liquid storing bags from a liquid ejection head. The erroneous insertion preventing member prevents the liquid container from being inserted into an improper liquid ejection device not having a designated shape.

Thus, the reverse insertion preventing member is provided to thereby prevent the liquid storing bag from being mounted in the liquid ejection device in an attitude other than a designated attitude. Further, the erroneous insertion preventing member is provided, whereby the liquid container having liquid storing bags storing liquid suitable for the liquid ejection device can only be mounted on the liquid ejection device. Accordingly, the liquid container cannot be mounted in a erroneous attitude on the liquid ejection device, and the liquid container not suitable for the liquid ejection device can not be mounted on the liquid ejection device, so that a designated liquid can be supplied to a designated portion of the liquid ejection device to more surely eject the designated liquid from the liquid ejection device.

According to another aspect, in the liquid container, the reverse insertion preventing member and/or the erroneous insertion preventing member is provided on the liquid container case. The reverse insertion preventing member and/or the erroneous insertion preventing member is provided between the liquid outlet port of the liquid storing bag disposed closest to the wall surface of the plurality of liquid storing bags and the wall surface, whereby even if the reverse insertion preventing member and/or the erroneous insertion preventing member is provided, the liquid container will not be increased in size.

According to another aspect of the invention, in the liquid container, the reverse insertion preventing member and/or the erroneous insertion preventing member is provided on the liquid container case between the liquid outlet port of the liquid storing bag disposed at the outermost end of the plurality of liquid storing bags and one wall surface of the liquid container case intersecting the base.

Thus, the reverse insertion preventing member and/or the erroneous insertion preventing member is provided on the liquid container case between the liquid outlet port of the liquid storing bag disposed on the most one wall surface side of the plurality of liquid storing bags and the above one wall surface of the liquid container case intersecting the base, whereby even if the reverse insertion preventing member and/or the erroneous insertion preventing member is provided, the liquid container will not be increased in size.

According to another aspect of the invention, the liquid container includes a circuit board having a storing part storing the information regarding the liquid container, and the circuit board is provided on the liquid container case between the liquid outlet port of the liquid storing bag disposed at the outermost end of the plurality of liquid storing bags and one wall surface of the liquid container case intersecting the base. Thus, the space of the liquid container case is effectively used to form a small-sized liquid container case.

According to another aspect of the invention, in the liquid container, the reverse insertion preventing member and/or the erroneous insertion preventing member, and the circuit board are provided on the liquid container case between the liquid outlet port of the liquid storing bag disposed at the outermost end of the plurality of liquid storing bags and one wall surface of the liquid container case intersecting the base.

Thus, the reverse insertion preventing member and/or the erroneous insertion preventing member and the circuit board are both or all provided, whereby the necessary functions can be collected efficiently in a compact in the liquid container case without any influence upon the liquid storing bags in the inside thereof.

According to another aspect of the invention, in the liquid container, the liquid storing bag is provided with an information indicating member having information regarding the liquid to confirm the liquid information regarding the liquid stored in the liquid storing bag with the liquid storing bag put in the liquid container case.

Thus, the liquid information regarding the liquid can be confirmed with the liquid storing bags accommodated in the liquid container case, whereby before the liquid container is mounted on the liquid ejection device, it can be confirmed whether or not a designated liquid storing bag is put in the liquid container certainly. Accordingly, there is less possibility of storing liquid other than a designated liquid in the liquid container by mistake.

According to the invention, the liquid ejection device includes an accommodation part for accommodating the liquid container. Thus, the liquid container is reduced in size, so that the liquid ejection device including the accommodation part for accommodating the liquid container can be reduced in size. In the liquid container, the space between the adjacent liquid outlet ports is gradually increased as it goes from the ends in the arranging direction of the liquid outlet ports toward the center, whereby the liquid stored in the liquid container can be used effectively.

According to the invention, a liquid container case is adapted to store a plurality of liquid storing bags, each having an outlet member having a liquid outlet port and being attached to a flexible film, and the liquid container case is provided with a plurality of support parts for supporting the outlet members to store the liquid storing bags with a part of the liquid storing bag overlapping a part of the adjacent liquid storing bag.

By this arrangement, the space required for accommodating the liquid storing bag having the same volume as the conventional one can be reduced so that the liquid container case can be reduced in size to reduce the size of the liquid container.

The present disclosure relates to the subject matter contained in Japanese patent application Nos. 2003-59020 (filed on Mar. 5, 2003) and 2004-31293 (filed on Feb. 6, 2004), each of which is expressly incorporated herein by reference in its entirety.

DESCRIPTION OF THE PREFERRED EMBODIMENT

The embodiments of a liquid container, a liquid ejection device and a liquid container case in which the invention is embodied will now be described according to FIGS. 1 to 7.

Figure 2:
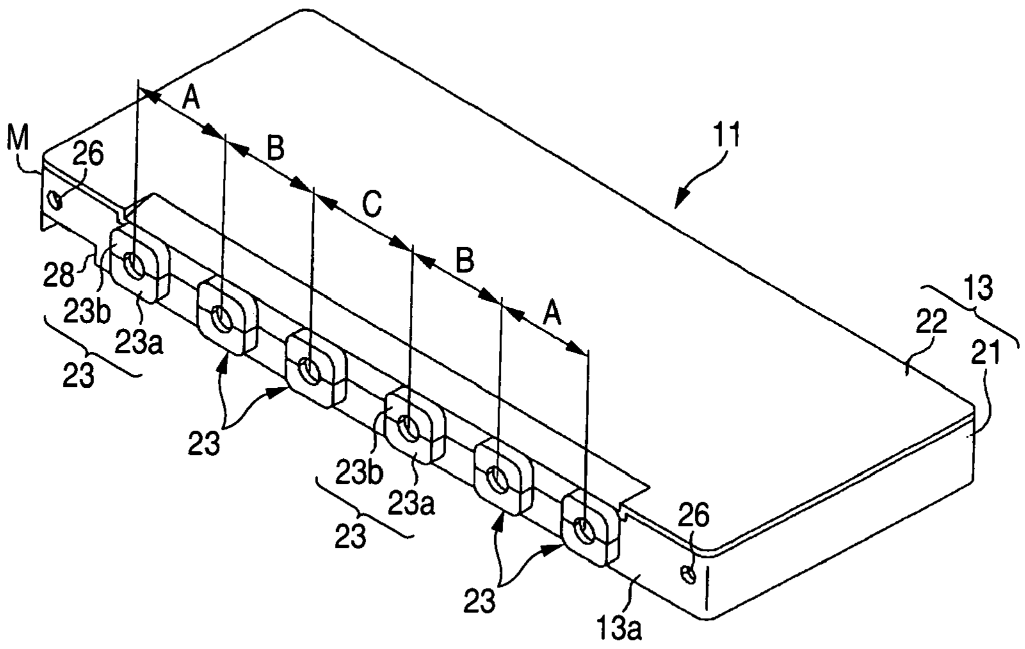
FIG. 2 is a perspective view, taken from the upper side of the ink cartridge.
Figure 4:
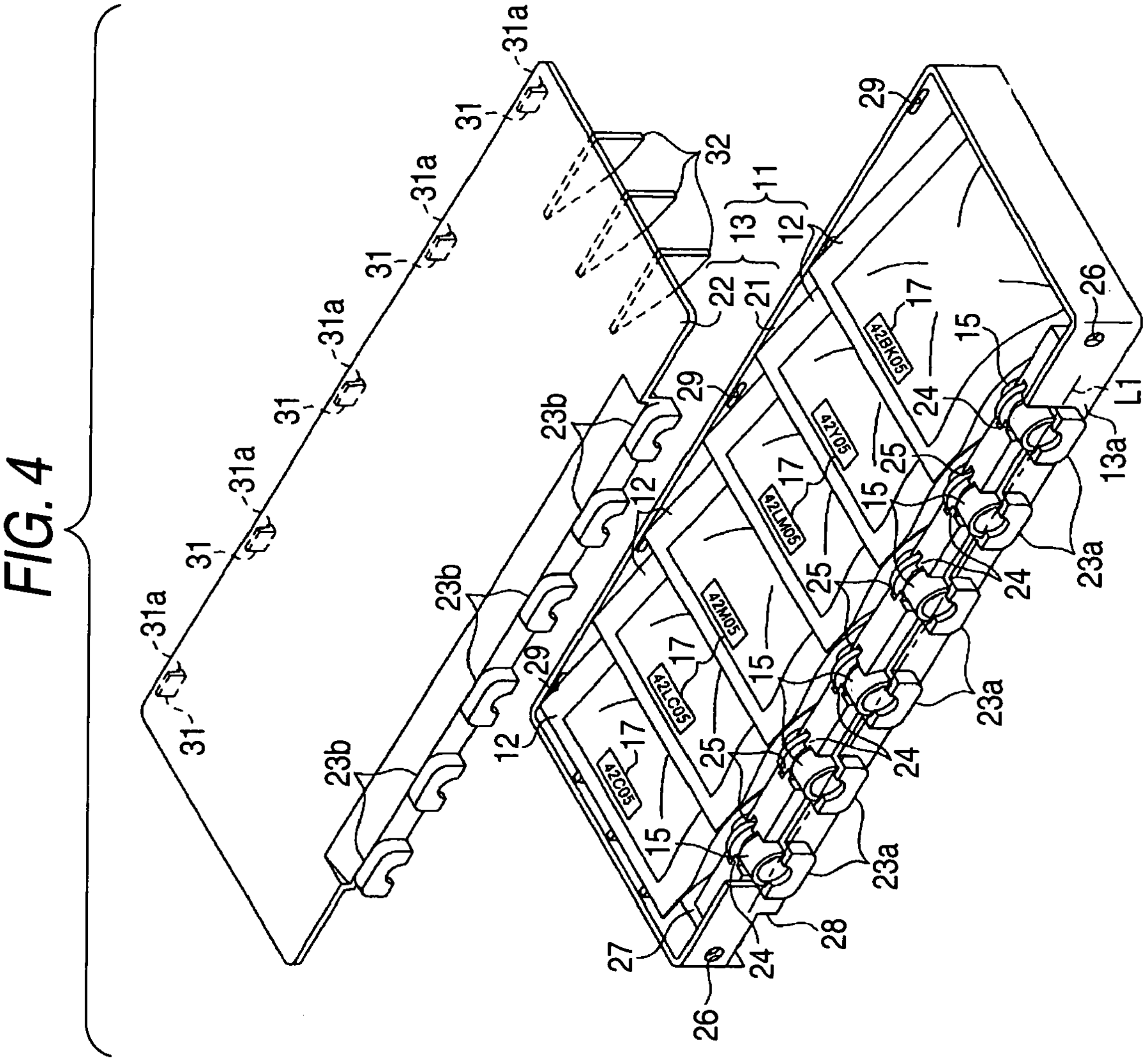
FIG. 4 is a perspective view, with an upper case detached from the ink cartridge.

As shown in FIG. 2, an ink cartridge 11 serving as a liquid container is substantially like a rectangular parallelepiped. The ink cartridge 11, as shown in FIG. 4, includes a plurality of ink packs 12 serving as liquid storing bags and a container case 13 for storing the ink packs.

Figure 7:
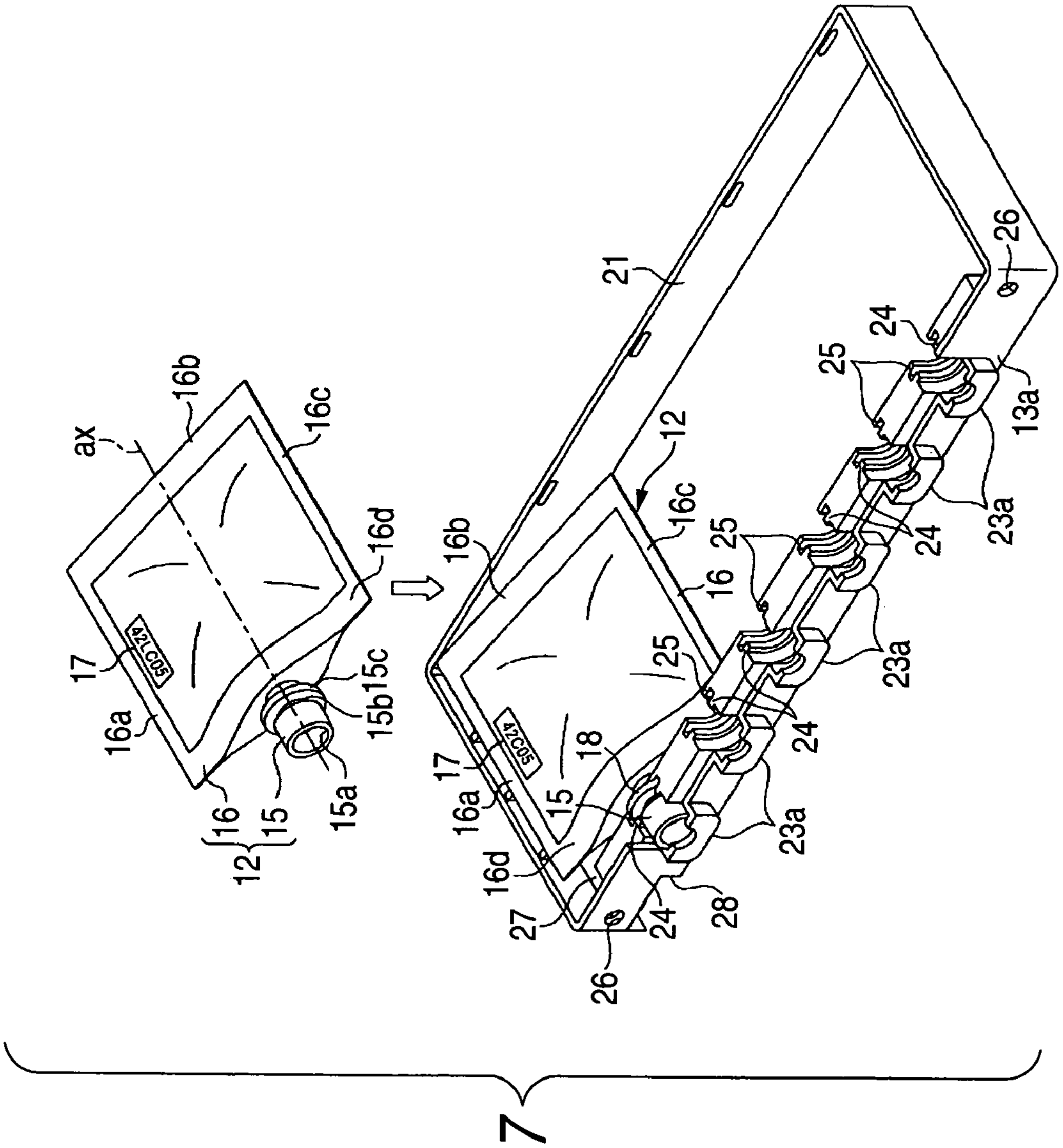
FIG. 7 is a perspective view in the course of explaining an assembling process of the ink cartridge.

First the ink pack 12 will be described. The ink pack 12 is, as shown in FIG. 7, made up of an ink outlet member 15 and a bag part 16.

The ink outlet member 15 is substantially cylindrical, and the inside thereof is provided with an ink supply port 15*a*. The ink stored in the ink pack 12 is taken out through the ink supply port 15*a*. Further, an annular groove 15*b* and an annular projection 15*c* provided adjacent to the groove 15*b* are formed the substantially central area of the outer peripheral surface of the ink outlet member 15. The ink supply port 15*a* is provided with a valve mechanism not shown, which is opened only when the ink is supplied, thereby preventing ink in the bag part 16 from leaking out.

The bag part 16 as a liquid storing part is formed of flexible material. For example, two sheets of laminated films, each obtained by depositing aluminum on a polyethylene film having gas barrier property can be preferably used, and four sides of the laminated films are welded by heat to form the bag part. In more detail, two sheets of laminated films are superposed one on the other, and welded by heat taking three sides of the laminated films as welding parts 16*a*, 16*b*, 16*d*. The remaining one side is taken as a welding part 16*d* and welded by heat with the ink outlet member 15 projected from the center thereof to form a bag-like shape. Thus, the ink pack 12 is formed like a soft case (the so-called pillow type), and ink is sealingly stored in the enclosed state in the interior thereof. The ink packs 12 in the present embodiment respectively have the same outline shape and the same ink storing capacity, and the ink packs are filled with the same fill quantity of ink.

A label 17 as an information indicating member is stuck to the upper surface of the bag part 16. The label 17 bears the information (corresponding to liquid information) on the quantity, color of the stored ink, or whether it is a dye or a pigment.

Figure 3:
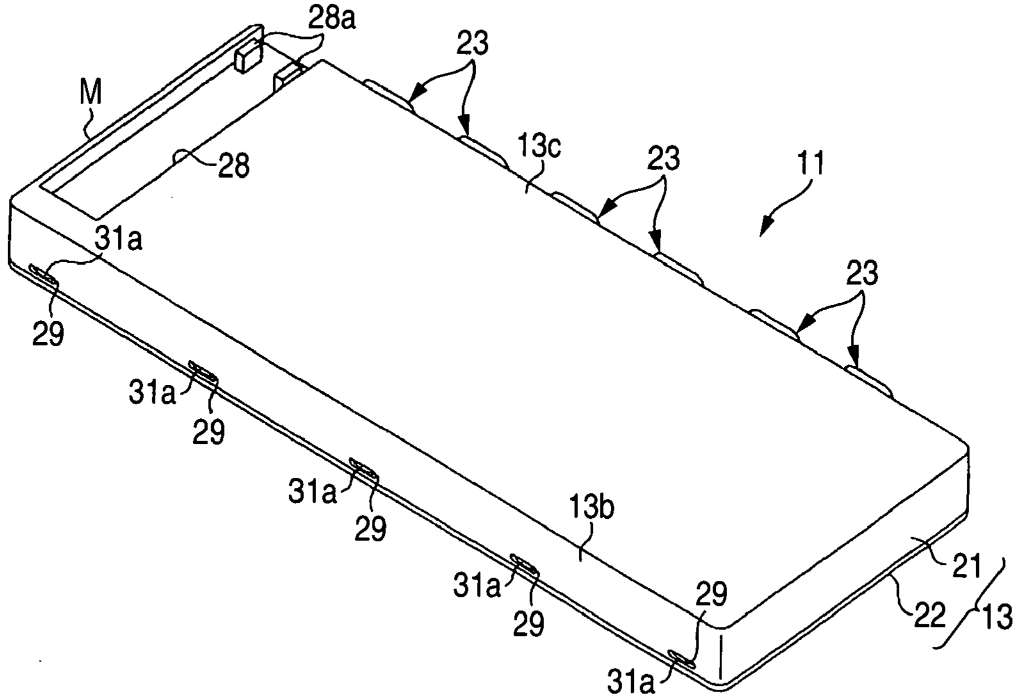
FIG. 3 is a perspective view, taken from the lower side of the ink cartridge shown in FIG. 2.

On the other hand, the container case 13 is, as shown in FIGS. 2 and 4, provided with a case body part 21 for accommodating the ink packs 12, and a lid case 22. The case body part 21 is, as shown in FIGS. 2 and 3, a substantially box-shaped case provided with a base S (see FIG. 5) and a front face 13*a* as a sidewall intersecting the base S, and opened on the opposite side to the base S. The opening part is sealingly closed by the lid case 22. The case body part 21 is formed of non-flexible hard material. The lid case 22 in the present embodiment is formed of non-flexible hard material similarly to the case body part 21.

In FIG. 2, the front face 13*a* of the container case 13 is provided with support parts 23 for fixing the respective ink outlet members 15 to expose the ink supply ports 15*a* of the ink packs 12 to the outside. The support parts 23 are provided for the same number as the number of stored ink packs 12, that is, six in the present embodiment. The support parts 23 are disposed along a straight line L1 (See FIG. 4) parallel to the base S and the front face 13*a* of the container case 13. The support parts 23 are provided in the substantially central area of the case body part 21. Each of the support parts 23 includes a lower support-part 23*a* constituting the lower half, which is mounted on the case body part 21, and an upper support part 23*b* constituting the upper half, which is mounted on the lid case 22. Accordingly, when the lid case 22 is attached to the case body part 21 with the ink outlet member 15 of the ink pack 12 supported on the lower support part 23*a* of the case body part 21, the lower and upper support parts 23*a*, 23*b* are aligned with each other to form the support part 23, thereby supporting and fixing the ink outlet member 15 of the ink pack 12.

Figure 5:
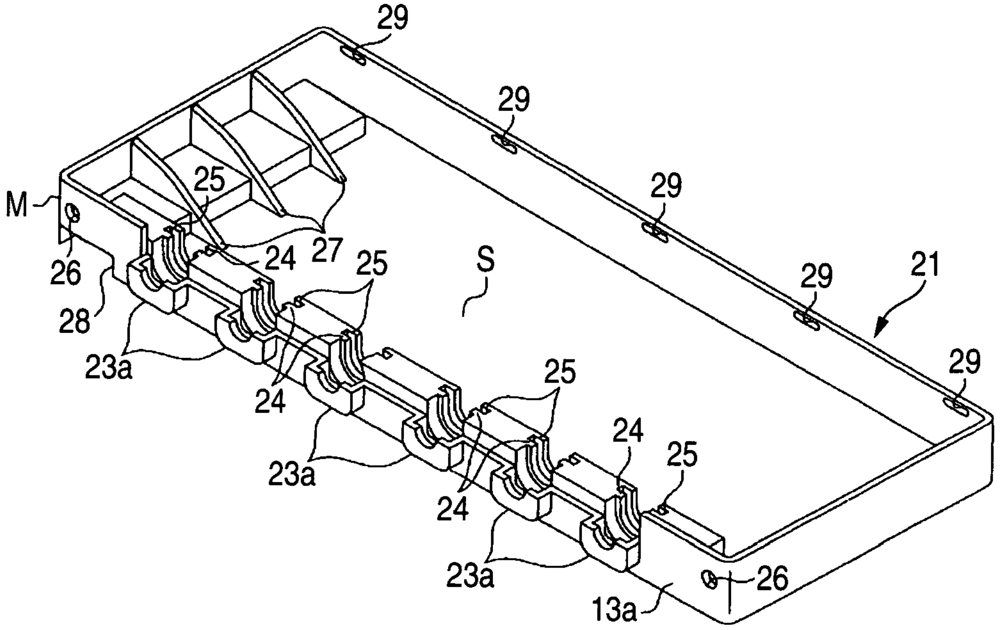
FIG. 5 is a perspective view of a lower case of the ink cartridge.

As shown in FIG. 5, the lower support part 23*a* is provided with a semi-circular arc-like projection 24 and a semi-circular arc-like groove 25, and these are respectively engaged with the groove 15*b* and the projection 15*c* of the ink outlet member 15. The upper support part 23*b* is, similarly to the lower support part 23*a*, provided with a projection not shown and a groove not shown. Accordingly, when the ink outlet member 15 of the ink pack 12 fits into the lower and upper support parts 23*a*, 23*b*, the ink pack 12 is put in the ink cartridge 11 without moving longitudinally and laterally.

The support parts 23 are provided in such positions that when the support parts 23 are respectively engaged with the ink outlet members 15, the ink packs 12 are disposed with a part of one of the ink packs 12 overlapping a part of adjacent one of the ink packs 12.

Figure 6:
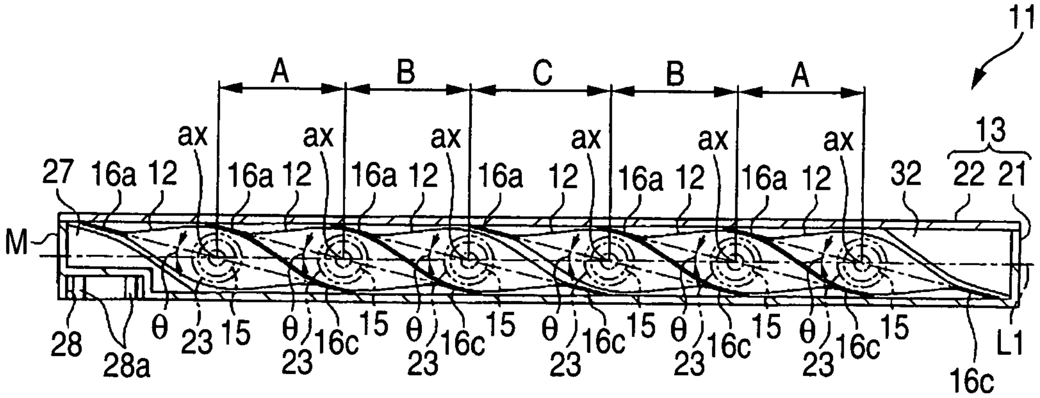
FIG. 6 is a typical front view of the ink cartridge.

As shown in FIG. 6, the spaces A, B, C between the support parts 23 are gradually decreased as it goes toward the ends, so that the spaces A at both ends are smaller than the spaces B rather closer to the center, and the spaces B are smaller than the central space C. That is, the respective support parts 23 are provided so that the space between the adjacent liquid outlet members 15 is gradually increased as it goes from the ends in the arranging direction of the liquid outlet members toward the center. It was found from the tests that when the spaces A, B, C are thus set, the pressure of ink delivered from the respective ink packs 12 becomes more uniform. The reason for this is that as in the present embodiment, when the ink packs 12 are superposed as shown in FIG. 6, the pressure of the ink packs 12 at the ends exerts an influence upon the pressure of the ink pack 12 located rather closer to the center. It is considered that the ink pack 12 disposed in the center is more influenced by the pressure of the adjacent ink pack 12 than that at the end. As a result, the pressure of the ink pack 12 applied to the adjacent ink pack 12 becomes substantially uniform regardless of the position of the ink pack 12 in the case body part 21.

As shown in FIG. 5, the front face 13*a* of the case body part 21 is provided with positioning holes 26 near both end parts thereof. The inside of the case body 21 is provided with three ribs 27 disposed parallel to the front face 13*a* on the left side as attitude determination means for determining the attitude of the ink pack 12. Accordingly, as shown in FIG. 6, the leftmost ink pack 12 put in the container case 13 is disposed along the ribs 27. Thus, the ink pack 12 holds the attitude of inclination at an angle θ (θ≈15° in the present embodiment) to the straight line L1 (and the base S of the container case 13) connecting the respective, support parts 23. Further, since the support part 23 is provided in a position substantially half of the height of the case body part 21, the ink pack 12, in the attitude of inclination at an angle θ, has its welding part 16*a* abutting on the lid case 22 and its welding part 16*c* abutting on the base S of the case body part 21.

Further, as shown in FIGS. 3 and 5, the lower surface 13*c* of the case body part 21 is provided with a groove 28 as a reverse insertion preventing member. The groove 28 is preferably located close to one wall surface M intersecting the base S, and below the ribs 27. The groove 28 is formed utilizing the space where the ink pack 12 is not disposed, which is formed between the ink outlet member 15 of the ink pack 12 disposed closest to the wall surface M of six ink packs 12 and the wall surface M. The formation of the groove 28 is extended from the front face 13*a* toward the back face 13*b* and ended on this side of the back 13*b*. Accordingly, the front face 13*a* is shaped so that the groove 28 is additionally formed in a substantially rectangular shape, whereas the back face 13*b* is simply formed in a substantially rectangular shape (See FIG. 1), That is, the front face 13*a* and the back 13*b* are different in shape. Further, the back face 13*b* of the case body part 21 is provided with engagement holes 29 for engagement with the lid case 22. Further, as shown in FIG. 3, the groove 28 is provided with two projections 28*a* projected downward as an erroneous insertion preventing member.

On the other hand, as shown in FIG. 4, engaging projection parts 31 are formed on the lid case 22, and each of the engaging projection parts 31 is provided with a projection 31*a* projected toward the back face 13*b*. The projection part 31*a* is engaged with the corresponding engagement hole 29 of the case body part 21, thereby integrally fixing the lid case 22 to the case body part 21. The lid case 22 is provided with three ribs 32 formed on the right side as an attitude fixing member for fixing the attitude of the ink pack 12. The ribs 32 have the same shape as the ribs 27 of the case body part 21 to thereby hold the ink pack 12 put in the rightmost side in an attitude of inclination at a designated angle θ.

A printer in which the ink cartridge 11 is mountable will now be described with reference to FIG. 1.

Figure 1:
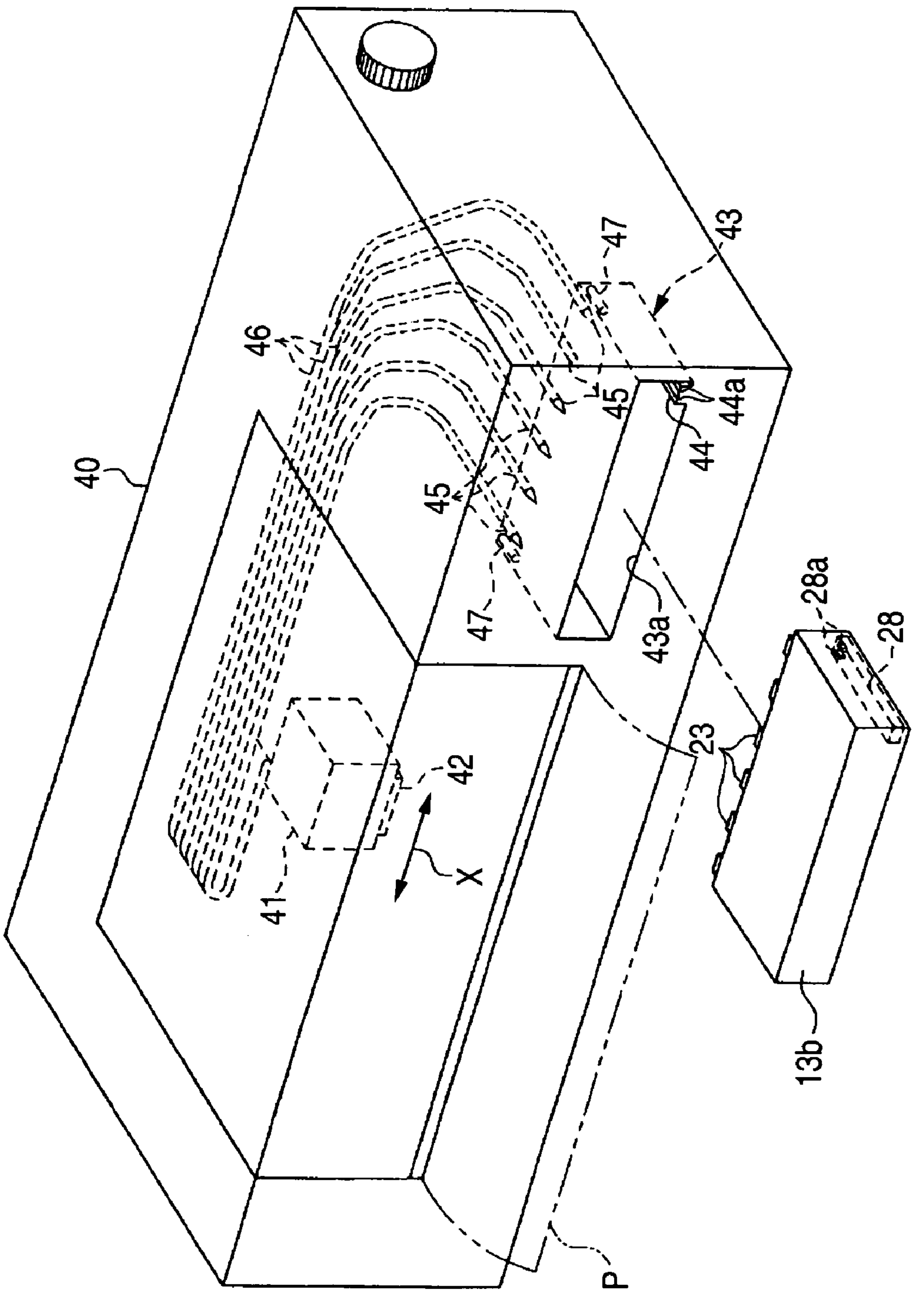
FIG. 1 is a schematic perspective view of a printer in which an ink cartridge is mounted.

As shown in FIG. 1, a printer body 40 is provided with a carriage 41 reciprocating in the direction of an arrow X. The lower surface of the carriage 41 is provided with a recording head 42 as a liquid ejection head having a plurality of nozzles. A cartridge mounting part 43 is provided on one side of the front face of the printer body 40. An insertion opening 43*a* as a storing part, into which the ink cartridge 11 is inserted, is formed on the cartridge mounting part 43. The insertion opening 43*a* is substantially like a rectangular parallelepiped, and provided with a projecting part 44 projected into the insertion opening 43*a*. The projecting part 44 is fitted to the groove 28 formed on the case body part 21 of the ink cartridge 11. Grooves 44*a* are formed on the upper surface of the projecting part 44. The groove 44*a* is fitted to the respective projection 28*a* of the groove 28 of the ink cartridge 11.

Accordingly, with the front face 13*a* directed toward the printer body 40, that is, only in the case where the groove 28 confronts with the projecting part 44, the cartridge 11 is mounted in the printer body 40. Only in the case where the shapes of the grooves 44*a* provided in the projecting part 44 and the projections 28*a* conform to each other, the ink cartridge 11 is mounted in the printer body 40.

The cartridge mounting part 43 of the printer body 40 is provided with a plurality of supply needles 45 disposed opposite to the ink cartridge 11. The respective supply needles 45 are disposed so that when the ink cartridge 11 is mounted on the ink cartridge mounting part 43, the respective supply needles 45 are positioned in the centers of the respective support parts 23 of the ink cartridge 11, that is, to be inserted in the respective ink supply ports 15*a* of the ink packs 12. Accordingly, when the ink cartridge 11 is mounted on the cartridge mounting part 43, ink in each ink pack 12 is supplied to the recording head 42 through a corresponding supply tube 46 and ejected from the recording head 42 toward the paper P.

Further, a pair of positioning members 47 are provided on both sides of the cartridge mounting part 43, i.e. regions outside a region where the supply needles 45 are disposed. When the container case 13 is mounted on the cartridge mounting part 43, the positioning members 47 are respectively fitted in the holes 26 of the case body part 21 to thereby fix the position of the ink cartridge 11. The positioning members 47 are formed longer than the supply needles 45, whereby positioning can be performed before the supply needles 45 are inserted in the ink supply ports 15*a* so as to surely achieve smooth insertion of the supply needles 45 into the ink supply ports 15*a*.

Assembling and mounting of the ink cartridge 11 will now be described.

As shown in FIG. 7, an ink pack 12 storing ink of Cyan color, for example, is mounted on the leftmost side of the case body part 21. That is, with the ink pack 12 fitted in the lower side support part 23*a* on the leftmost side of the case body part 21, the ink pack 12 is mounted on the case body part 21. The ink pack 12 is put in the attitude of inclination at a designated angle θ. At the time, the label 17 is seen on the upper part of the ink cartridge 11.

Subsequently, the ink pack 12 storing ink of light Cyan color is put in the case body part 21, with the ink outlet member 15 engaged with the second lower support port 23*a* from the left. The ink pack 12 is inclined to take the substantially same attitude as the previously stored ink pack 12. At the time, the welding part 16*a*, which is the end of the inserted ink pack 12, is located on the most expanded part in the center of the bag part 16 of the previously stored ink pack 12. That is, as shown in FIG. 6, the respective ink packs 12 are disposed so that the substantially half of the ink pack 12 overlaps about the half of the adjacent ink pack 12. At the time, the label 17 of the previously stored ink pack 12 can be seen without being hidden.

After that, similarly an ink pack 12 storing ink of Magenta color, for example, is inserted with the ink outlet member 15 of the ink pack 12 supported on the third lower support part 23*a* from the left. Subsequently, an ink pack 12 storing ink of light Magenta color, for example, is inserted with the ink outlet member 15 of the ink pack 12 supported on the fourth lower support part 23*a* from the left. Further, similarly, an ink pack 12 storing ink of yellow color is inserted on the fifth one from the left, and finally, as shown in FIG. 4, an ink pack 12 storing ink of black color is inserted on the rightmost side.

As shown in FIG. 4, when all of six ink packs 12 are inserted in the case body part 21, the labels 17 of the respective ink packs 12 are arranged on the upper surface side by side. According to the labels 17, it is visually confirmed whether or not the six ink packs 12 different in kind are stored in the ink cartridge 11. At the end of visual confirmation, the engaging projection parts 31 of the lid case 22 are engaged with the engagement holes 29 of the case body part 21, and the case body part 21 is fitted to the lid case 22 to cover the opening of the case body part 21. Thus, the respective ink packs 12 are, as shown in FIG. 6, stored and held by the lid case 22. The ribs 32 of the lid case 22 are located on the right upper part of the ink pack 12 at the right end. Accordingly, the attitude of the rightmost ink pack 12 is held.

The lid case 22 is thus fitted to the case body part 21 to assemble the ink cartridge 11 as shown in FIGS. 2 and 3. The ink cartridge 11 is, as shown in FIG. 1, inserted in the insertion opening 43*a* of the cartridge mounting part 43 with the groove 28 opposite to the projection 44 and with the front face 13*a* opposite to the printer body 40. Since the shape of the back face 13*b* is different from the shape of the front face 13*a*, in the longitudinally reverse attitude where the back face 13*b* confronts with the printer body 40, the ink cartridge 11 cannot be mounted on the cartridge mounting part 43. Also in the case of the inverted attitude in which the groove 28 is not opposite to the projecting part 44, the ink cartridge 11 cannot be mounted on the cartridge mounting part 43. Further, when there is no conformity in the shape of the projections 28*a* and the grooves 44*a*, the ink cartridge 11 cannot be mounted in the printer body 40.

When the ink cartridge 11 is inserted in the insertion opening 43*a* and mounted on the cartridge mounting part 43, the positioning members 47 of the printer body 40 are fitted in the holes 26 to thereby fix the position of the ink cartridge 11. Further, the supply needles 45 of the cartridge mounting part 43 are inserted in the centers of the respective support parts 23 of the ink cartridge 11, that is, in the ink support ports 15*a* of the ink pack 12, and the valve mechanism in each of the ink supply port 15*a* opens the valve. Thus, ink can be supplied from each ink pack 12 of the ink cartridge 11 through the corresponding ink supply needle 45 and supply tube 46 to the recording head 42 of the carriage 41. Ink is ejected from the nozzles of the recording head 42 toward the paper P to perform printing.

The ink cartridge 11 of the present embodiment will produce the following effects.

(1) in the ink cartridge 11 of the present embodiment, as shown in FIG. 6, with a part of the ink pack 12 overlapping a part of the adjacent ink pack 12, the ink packs 12 are put in the container case 13. Therefore, even in the ink cartridge 11 storing a plurality of ink packs 12 having the same capacity as the conventional one, the ink cartridge 11 can be reduced in size for the overlapping part of the ink packs 12. Since the ink packs 12 in the ink cartridge 11 respectively store ink of only one color, the container case 13 can easily support the plurality of ink packs 12, and also the respective ink packs 12 can be simply replaced.

(2) In the ink cartridge 11 of the present embodiment, the ink packs are disposed so that the space between the adjacent ink outlet members 15 is gradually increased as it goes from the ends toward the center in the arranging direction of the ink outlet members 15. As a result, the pressure applied to each ink pack 12 can be made substantially uniform regardless of the position of the ink pack 12 in the container case 13. Thus, the ink supply characteristic to the recording head 42 can be made uniform regardless of the position of the ink pack 12, so that the ink discharge characteristic from the recording head 42 can be made uniform.

The ink outlet members 15 are thus arranged, whereby the size of the ink cartridge 11 can be reduced without needlessly spacing the adjacent ink packs 12 from each other in consideration of pressure generated between the adjacent ink packs 12.

According to the invention, with the ink packs 12 of the same shape and same capacity, in the case where the fill quantity of ink is made uniform (e.g. the maximum value or designated value), the ink cartridge 11 having the determined space of the ink outlet members 15 can store the ink packs 12 different in the fill quantity of ink according to the consumption status of ink in the range of not exceeding the maximum value of the ink fill quantity or the designated value. Also in this case, the pressure applied to the ink packs 12 can be made substantially uniform.

In the case where the filling rate of ink of the ink pack 12 located in the center is larger than the filling rate of ink of the ink pack 12 located in the other places, the space between the adjacent ink outlet members 15 is expanded to make the pressure applied to the ink packs 12 substantially uniform.

In the case where the filling rate of ink of the ink pack 12 located in the center is smaller than the filling rate of ink of the ink pack 12 located in the other places, it is possible to make the central pitch smaller.

(3) According to the present embodiment, the ink cartridge 11 can be reduced in size, so that the printer body 40 can be reduced in size.

(4) In the present embodiment, a portion of the lower surface 13*c* of the case body 21, which is close to one wall surface M intersecting the base S and below the rib 27, is provided with the groove 28 formed as the reverse insertion preventing member and two projections 28*a* formed as the erroneous insertion preventing member. Accordingly, even if the reverse insertion preventing member and the erroneous insertion preventing member are provided, the ink cartridge 11 will not be increased in size.

(5) In the ink pack 12 of the present embodiment, as the welding parts 16*a*, 16*b*, 16*c*, four sides of two flexible films are welded. The ink pack 12 is, as shown in FIG. 6, formed into a spindle-like liquid storing bag most expanded in the central parts of the flexible films in the state of storing ink. That is, the shape of the space between the container case 13 and the ink pack 12 approximates to the shape of the ink pack 12 from the welding part 16*a*, 16*c*at the end of the ink pack 12 to the central part. Therefore, a part of the adjacent ink pack 12 is inserted in the space between the ink pack 12 and the container case 13 to increase the overlapping part, so that the space in the container case 13 can be used more effectively. Accordingly, the ink cartridge can be reduced in size.

(6) According to the present embodiment, in the ink cartridge 11, as shown in FIG. 6, the central axes (ax) of the ink supply ports 15*a* of the ink packs 12 are arranged on the straight line L1 on the same horizontal plane, and the ink supply ports 15*a* are disposed at the same height. That is, since the pressure head depending on the height of each ink pack 12 becomes equal, the pressure of a liquid supplied from each ink pack 12 through the supply tube 46 to the carriage 41 can be made substantially uniform.

(7) According to the present embodiment, the ink packs 12 put in the ink cartridge 11 are disposed so that the plane PL of the ink pack 12 is inclined at a designated angle θ to the straight line L1 of arranging the ink supply ports 15*a*, that is, to the container case 13. Accordingly, when the ink pack 12 most expanded in the central area is inclined at a designated angle θ, the spaces produced on the upper and lower sides of the welding part 16*c* of the ink pack 12 are formed into one large space partitioned on the upper side of the welding part 16*c*. Another ink pace 12 is disposed in the space partitioned on the upper side of the welding part 16*c*. Thus, the overlapping part of the ink pack 12 and the adjacent, ink pack 12 is further increased so that the internal space of the ink cartridge 11 can be used more effectively so as to reduce the size of the ink cartridge 11.

(8) In the ink cartridge 11 of the present embodiment, the ribs 27 are provided on the case body part 21. Accordingly, the first ink pack 12 put in the ink cartridge 11 is held in its attitude of inclination by the ribs 27. The next ink pack 12 to be inserted is held in its attitude of inclination by the previously inserted ink pack 12. Further, the respective ink packs 12 are held by the attitude of inclination by the lid case 22. Thus, the respective ink packs 12 can be held in the attitude of inclination at a designated angle θ without impairing the attitude.

(9) According to the embodiment, the ribs 32 are provided in addition to the ribs 27, whereby the ink packs 12 are made harder to rock. Accordingly, there is little fear of damaging the ink packs 12 due to a collision with the container case 13.

(10) In the present embodiment, the ribs 27 are formed integral with the case body part 21, and the ribs 32 are formed integral with the lid case 22. Accordingly, the ribs 27, 32 for holding the attitude of the ink packs 12 are not provided as separate members, so the number of parts can be decreased so as to manufacture the ink cartridge at a low cost. The positioning member is always placed in a designated position not to be moved. Accordingly, the ink packs 12 can be easily disposed in a designated attitude in the ink cartridge 11.

(11) In the present embodiment, the ink cartridge 11 is provided with the groove 28 disposed at the left lower side in FIG. 2. Accordingly, as shown in FIG. 1, the ink cartridge 11 can be mounted in the insertion opening 43*a* of the printer body 40 only in the attitude in which the front face 13*a* of the ink cartridge 11 confronts with the printer body 40, and the groove 28 is inserted in the projecting part 44 of the printer body 40. Accordingly, the ink cartridge 11 will not be mounted in the printer body 40 in the attitudes other than the above. That is, since only ink of a specified color can be supplied to a specified portion of the recording head 42 through the supply tube 46, the printer body 40 is capable of more surely ejecting the ink of a designated color.

(12) In the present embodiment, the groove 28 is provided with the projection 28*a* and the projecting part 4 is provided with the groove 44*a*, whereby only when the projection 28*a* and the groove 44 conform to each other in shape, the ink cartridge 11 is mounted on the printer body 40, so it is possible to more surely prevent different ink cartridges from being mounted. Even in the case of the ink cartridge 11 having the same whole shape, it is possible to easily prevent the ink cartridge 11 which should not be mounted in the printer body 40 from being inserted only by changing the shape of the projection 28*a* formed on the groove 28.

(13) In the present embodiment, the groove 28 as the reverse insertion preventing member and the projection 28*a* as the erroneous insertion preventing member are provided in the space produced between the ink pack 12 and the case body part 21. That is, since the internal space of the ink cartridge 11 is effectively used, even if the groove 28 as the reverse insertion preventing member and the projection 28*a* as the erroneous insertion preventing member are provided, the liquid container will not be increased in size.

(14) In the ink cartridge 11 of the present embodiment, six ink packs are disposed in the ink pack 12, the space C between the ends of the ink supply ports 15*a* is smaller than the space B rather closer to the center, and the space B is smaller than the space A rather closer to the center. The space A is thus set, whereby the pressure of ink discharged from the respective ink packs 12 can be made uniform.

(15) In the present embodiment, the label 17 is stuck in such a position to be seen when the ink pack 12 is put in the container case 13. Accordingly, it is possible to confirm whether or not the ink packs 12 stored in the ink cartridge 11 are disposed certainly by reading the labels 17 before the lid case 22 is fitted to the case body part 21. Thus, there is little possibility of storing ink other than designated ink in the ink cartridge 11 by mistake.

(16) In the present embodiment, all of the ink packs 12 in the container case 13 are disposed at the same angle θ of inclination. Accordingly, the pressure discharged from the respective ink packs 12 can be made uniform.

(Modified Form)

The respective embodiments may be modified as in the following.

Although not only the front face 13*a* but also other side walls are all provided on the case body side 21 in the container case 13 of the embodiment, the similar effect to that of the embodiment can be obtained even in the case of a container case where a part of the side walls other than the front face 13*a* is provided on the lid case 22 side.

Although the lower support part 23*a* constituting the lower half of the support part 23 is provided on the case body part 21 and the upper support part 23*b* constituting the upper half is provided on the lid case 22 in the embodiment, the similar effect to that of the embodiment can be obtained even in the case where ribs or the like projected from the base S are used as the support part 23. That is, the support part 23 may be entirely provided on the case body part 21.

Although the container case 13 of the embodiment is provided with the lid case 22 as a lid member, the similar effect to that of the embodiment can be obtained even in the container case without the lid case 22.

Although the lid case 22 of the embodiment is formed of non-flexible material, which is the similar material to that of the case body part 21, it may be formed of flexible material such as a film.

Although the description of the embodiment deals with the bag parts 16 of the ink packs 12 having the same ink storing capacity and filled with the same fill quantity of ink to the bag parts 16, the similar effect can be obtained in the case where the bag parts 16 having the same ink storing capacity are different in the ink fill rate.

The number of ink packs 12 may be numbers other than that in the embodiments.

The ribs 27, 32 as the attitude holding members for holding the inclined attitudes of the ink packs 12 may be provided separately from the case body part 21 and the lid case 22.

The erroneous insertion preventing member may be a projecting part instead of the groove 28. The groove 28 may be provided on the side, not on the lower surface of the case body part 21, and it may be provided on the lid case 22. Further, a chip (a circuit board having a storage element such as a semiconductor storage element like EEPROM as a storage part storing the information (ink residual quantity, ink type and date of manufacture, etc.) and a contact adapted to abut on a contact of the printer body 40) electrically operated when the ink cartridge 11 is mounted in a designated attitude and orientation in the printer body 40 may be provided in a predetermined portion of the ink cartridge 11.

A label 17 may be formed as a bar code and confirmed by a computer instead of visually confirming the label 17 before the lid case 22 is fitted to the case body part 21. The case body part 21 may be formed as a transparent case, and the label 17 may be disposed to be seen from the base, or the label 17 may be confirmed from the back face.

The shape of the ink pack 12 may be any shape other than pillow type in which four sides of two sheets of flexible films are welded, and, for example, may be the so-called gazette type in which four sheets of flexible films are welded.

The ink cartridge 11 may be modified to have a pressurized air inlet port, and to establish a hermetically sealed state when the ink cartridge 11 is mounted on the printer body 40, so that the pressurized air can be applied to the interior of the ink cartridge 11. To realize this modification, structures disclosed, for example, in U.S. patent application publication 20010024225A1 can be used in the ink cartridge 11 according to the present invention.

Figure 8:
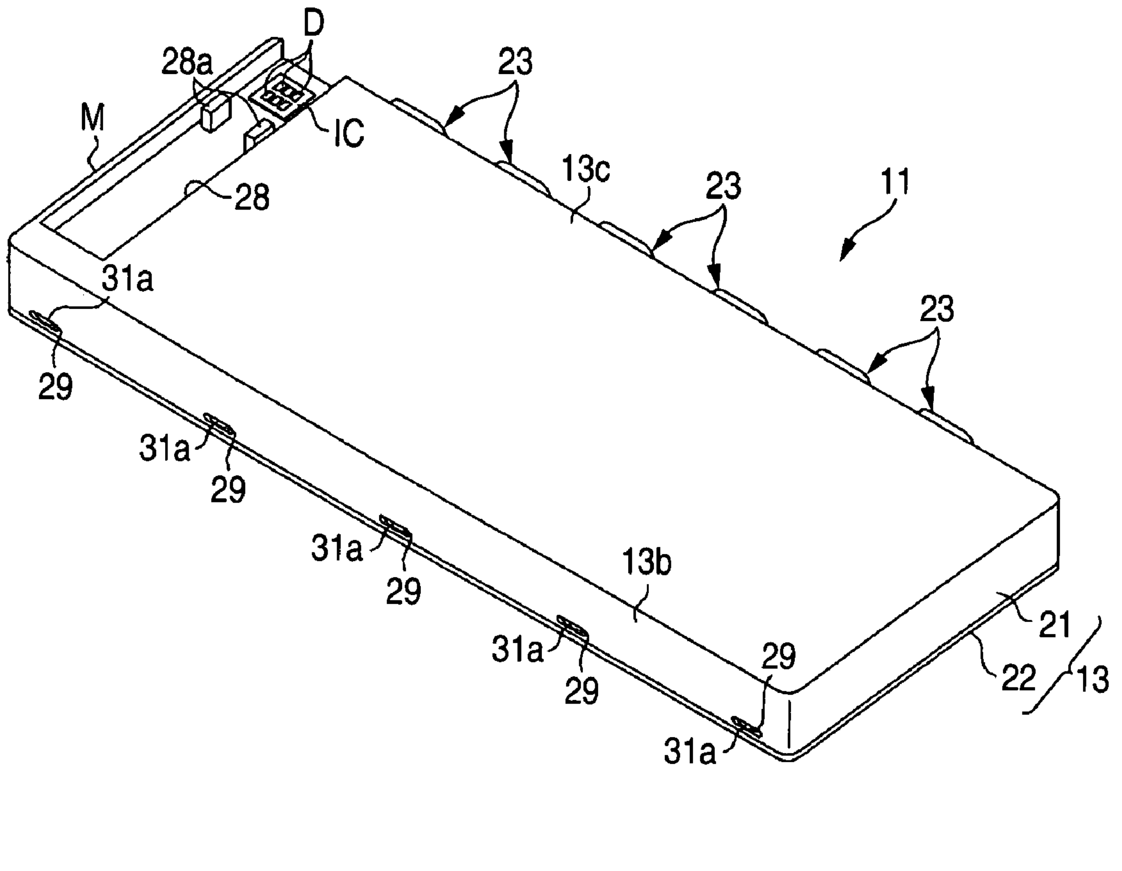
FIG. 8 is a perspective view, taken from the lower side of the ink cartridge described in a modified form.

In the groove 28 formed utilizing the space where no ink pack 12 is disposed between the ink outlet member 15 of the ink pack 12 disposed closest to the wall surface M of the six ink packs 12 and the wall surface M, a circuit board IC having a storage element D as a storage part of the semiconductor storage element such as EEPROM as a storage part storing the information (ink residual quantity, ink type and date of manufacture, etc.) on the ink pack 12 and a contact adapted to abut a contact of the printer body may be placed. FIG. 8 is a perspective view taken from the lower side of the ink cartridge 11 on which such circuit board IC is disposed.

According to the modified form, the space of the ink cartridge 11 is effectively used to form a small-sized ink cartridge. Further, the ink cartridge is formed with two projections 28*a* as the erroneous insertion preventing member, whereby more efficient and necessary functions can be collected in a compact without any influence on the inner ink packs 12.

The technical ideas grasped from the above embodiments and modified forms will now be described with the effects thereof in the following.

(a) A liquid container including: a plurality of liquid storing bags formed of a flexible film, having an outlet member with a liquid outlet port and storing a liquid; and a liquid container case for accommodating the plurality of liquid storing bags, is characterized in that the liquid storing bags are put in the liquid container case in the state of overlapping the adjacent liquid storing bag, with the most expanded part not overlapping the most expanded part of a liquid storing bag adjacent to the liquid storing bag in the state of enclosing the liquid.

According to the invention described in the above (a), the liquid storing bags are disposed with the most expanded part not overlapping the most expanded part of the adjacent liquid storing bag, whereby the space in the liquid container case can be effectively used to dispose the liquid storing bags. Therefore, even if a plurality of liquid storing bags are disposed in the same manner as before, the capacity of space required for accommodation can be decreased and the liquid container can be reduced in size. Accordingly, a liquid ejection device in which the liquid container is mounted can be reduced in size.

(b) A liquid container including: a plurality of liquid storing bags formed of a flexible film, having an outlet member with a liquid outlet port and storing a liquid; and a liquid container case for accommodating the plurality of liquid storing bags, is characterized in that the liquid container case is substantially like a rectangular parallelepiped, and the plurality of liquid storing bags are accommodated at a designated angle of inclination to the base of the liquid container case.

According to the invention described in the above (b), the plurality of liquid storing bags are accommodated at a designated angle of inclination to the liquid container case shaped substantially like a rectangular parallelepiped, whereby the adjacent liquid storing bag can be easily disposed in the space produced between the liquid storing bag and the liquid container case. Accordingly, the liquid storing bags are disposed at good volume efficiency in the liquid container case to reduce the size of the liquid container. Further, since the liquid container can be reduced in size, a liquid ejection device in which the liquid container is mounted can be reduced in size. Since the plurality of liquid storing bags are put in one liquid container case, only the liquid storing bag of a specified liquid can be easily replaced so that the liquid stored in the liquid container can be effectively used.

What is claimed is:

1. A liquid container, comprising:

at least four liquid storing bags, each including:

a liquid outlet member having a liquid outlet port, and a liquid storing part formed of flexible film material; and a liquid container case including:

a base, and support parts for fixing the liquid outlet members to expose the liquid outlet ports to an outside of the liquid container case, wherein the at least four liquid storing bags are disposed to be shifted from each other with a part of the liquid storing bag overlapping a part of the adjacent liquid storing bag along the base of the liquid container case in an interior of the liquid container case.

2. The liquid container according to claim 1, wherein:

the liquid container case includes:

a case body having the base, a side wall intersecting the base and having the support parts, and an open face opposite to the base; and a lid member covering the open face.

3. The liquid container according to claim 1, wherein a space between the adjacent liquid outlet ports is gradually increased as it goes from ends in the arranging direction of the liquid outlet ports toward a center.

4. The liquid container according to claim 2, wherein a space between the adjacent liquid outlet ports is gradually increased as it goes from ends in the arranging direction of the liquid outlet ports toward a center.

5. The liquid container according to any one of claims 1 to 4, wherein the liquid storing bag is formed by welding four sides of two sheets of flexible films.

6. The liquid container according to any one of claims 1 to 4, wherein central axes of the liquid outlet ports are all disposed on the same horizontal plane.

7. The liquid container according to any one of claims 1 to 4, wherein the liquid storing bags are stored at a designated angle of inclination.

8. The liquid container according to claim 7, wherein the liquid container case further includes a member adapted to hold the liquid storing bags in an attitude of being inclined at a designated angle.

9. The liquid container according to claim 8, wherein the attitude holding member is formed integral with the liquid container case.

10. The liquid container according to any one of claims 1 to 4, further comprising:

at least one of a reverse insertion preventing member and an erroneous insertion preventing member, wherein the reverse insertion preventing member prevents the liquid container from being mounted in an attitude other than a designated attitude to a liquid ejection device for ejecting liquid in the liquid storing bags from a liquid ejection head, and the erroneous insertion preventing member prevents the liquid container from being inserted into an improper liquid ejection device not having a designated shape.

11. The liquid container according to claim 10, wherein the reverse insertion preventing member and/or the erroneous insertion preventing member are disposed on the liquid container case.

12. The liquid container according to claim 11, wherein the reverse insertion preventing member and/or the erroneous insertion preventing member is disposed on the liquid container case between the liquid outlet port of the liquid storing bag disposed at the outermost end of the plurality of liquid storing bags and one wall surface of the liquid container case intersecting the base.

13. The liquid container according to any one of claims 1 to 4, further comprising:

a circuit board having a storing part storing information regarding the liquid container, wherein the circuit board is disposed on the liquid container case between the liquid outlet port of the liquid storing bag disposed at the outermost end of the plurality of liquid storing bags and one wall surface of the liquid container case intersecting the base.

14. The liquid container according to claim 10, further comprising:

a circuit board having a storing part storing information regarding the liquid container, wherein the reverse insertion preventing member and/or the erroneous insertion preventing member, and the circuit board are disposed on the liquid container case between the liquid outlet port of the liquid storing bag disposed at the outermost end of the plurality of liquid storing bags and one wall surface of the liquid container case intersecting the base.

15. The liquid container according to any one of claims 1 to 4, wherein each of the liquid storing bags is provided with an information indicating member having information regarding liquid stored therein.

16. A liquid ejection device, comprising an accommodation part for accommodating the liquid container as claimed in any one of claims 1 to 4.

17. A liquid container comprising:

a first and a second liquid storing bag, each including:

flexible liquid storing part having an upper surface and a lower surface, and a liquid outlet member being attached to the liquid storing part and having a liquid outlet port in fluid communication with an interior of the liquid storing part;

a liquid container case including:

a base defining a bottom surface, and a first side wall intersecting the base, and receiving the liquid outlet members of the first and second liquid storing bags, a first slope member defining a first slope surface inclined relative to the bottom surface, wherein:

the lower surface of the liquid storing part of the first liquid storing bag partly contacts the slope surface and the bottom surface; and the lower surface of the liquid storing part of the second liquid storing bag partly contacts the upper surface of the liquid storing part of the first liquid storing bag and the bottom surface;

a third and a fourth liquid storing bag, each including:

a flexible liquid storing part having an upper surface and a lower surface, and a liquid outlet member being attached to the liquid storing part, having a liquid outlet port in fluid communication with an interior of the liquid storing part, and being received by the side wall, wherein:

the lower surface of the liquid storing part of the third liquid storing bag partly contacts the upper surface of the liquid storing part of the second liquid storing bag and the bottom surface; and the lower surface of the liquid storing part of the fourth liquid storing bag partly contacts the upper surface of the liquid storing part of the third liquid storing bag and the bottom surface.

18. The liquid container according to claim 17, wherein:

an axis-to-axis distance between the liquid outlet ports of the first and second liquid storing bags is shorter than an axis-to-axis distance between the liquid outlet ports of the second and third liquid storing bags.

19. The liquid container according to claim 18, wherein:

the axis-to-axis distance between the liquid outlet ports of the second and third liquid storing bags is shorter than an axis-to-axis distance between the liquid outlet ports of the third and fourth liquid storing bags.

20. The liquid container according to claim 17, wherein the first, second, third and fourth liquid storing bags has the same shape and the same liquid storing capacity.

21. The liquid container according to claim 17, wherein a quantity of liquid filled in one of the first, second, third and fourth liquid storing bags is different from a quantity of liquid filled in another of the first, second, third and fourth liquid storing bags.

22. The liquid container according to claim 17, wherein axes of the liquid outlet ports of the first, second, third and fourth liquid storing bags are arranged on a line extending parallel to the base of the liquid container case.

23. The liquid container according to claim 22, wherein each of the liquid storing bags defines an imaginary plane that connects a lateral side at which the upper surface meets the lower surface to an opposite lateral side at which the upper surface meets the lower surface and that also contains an axis of the liquid outlet port, and the imaginary plane of each of the liquid storing bags is inclined about 15 degrees relative to the line on which the axes of the liquid outlet ports are arranged.

24. The liquid container according to claim 17, wherein a label is attached to the upper surface of the first liquid storing bag at a location where the label does not contact the lower surface of the second liquid storing bag.

25. A liquid container comprising:

a first and a second liquid storing bag, each including:

flexible liquid storing part having an upper surface and a lower surface, and a liquid outlet member being attached to the liquid storing part and having a liquid outlet port in fluid communication with an interior of the liquid storing part;

a liquid container case including:

a base defining a bottom surface, and a first side wall intersecting the base, and receiving the liquid outlet members of the first and second liquid storing bags, a first slope member defining a first slope surface inclined relative to the bottom surface, wherein:

the lower surface of the liquid storing part of the first liquid storing bag partly contacts the slope surface and the bottom surface; and the lower surface of the liquid storing part of the second liquid storing bag partly contacts the upper surface of the liquid storing part of the first liquid storing bag and the bottom surface;

a groove extending from the first side wall in a direction perpendicular to the first side wall, and being located in a region between the slope surface and a second side wall that intersects the base and the first side wall and that extends in the direction perpendicular to the first side wall.

26. The liquid container according to claim 25, wherein a plurality of projections are disposed in the groove.

27. The liquid container according to claim 25, wherein a circuit board having a memory and an electric contact is disposed in the groove.

28. The liquid container according to claim 27, wherein the axis-to-axis distance between the liquid outlet ports of the first and second liquid storing bags is equal to the axis-to-axis distance between the liquid outlet ports of the third and fourth liquid storing bags.

29. The liquid container according to claim 27, further comprising:

a fifth and a sixth liquid storing bags, each including:

a flexible liquid storing part, and a liquid outlet member attached to the liquid storing part and having a liquid outlet port in fluid communication with an interior of the liquid storing part, wherein:

the liquid outlet port of the first liquid storing bag is arranged between the liquid outlet ports of the fifth and the second liquid storing bags;

the liquid outlet port of the fourth liquid storing bag is arranged between the liquid outlet ports of the third and the sixth liquid storing bags;

an axis-to-axis distance between the liquid outlet ports of the fifth and the first liquid storing bags is smaller than the axis-to-axis distance between the liquid outlet ports of the first and the second liquid storing bags; and an axis-to-axis distance between the liquid outlet ports of the fourth and the sixth liquid storing bags is smaller than the axis-to-axis distance between the liquid outlet ports of the third and the fourth liquid storing bags.

30. A liquid container comprising:

a first, a second, a third and a fourth liquid storing bag, each including:

a flexible liquid storing part, and a liquid outlet member attached to the liquid storing part and having a liquid outlet port in fluid communication with an interior of the liquid storing part;

a liquid container case including:

a base, and a first side wall intersecting the base, and receiving the liquid outlet members of the first, second, third and fourth liquid storing bags so that liquid outlet ports of the first, second, third and fourth liquid storing bags are arranged in this order, wherein:

an axis-to-axis distance between the liquid outlet ports of the first and second liquid storing bags is smaller than an axis-to-axis distance between the liquid outlet ports of the second and third liquid storing bags; and an axis-to-axis distance between the liquid outlet ports of the third and fourth liquid storing bag is smaller than the axis-to-axis distance between the liquid outlet ports of the second and third liquid storing bags.

31. The liquid container according to claim 30, wherein:

each of the flexible liquid storing parts of the first, second, third and fourth liquid storing bags has an upper surface and a lower surface;

the base defines a bottom surface;

the lower surface of the liquid storing part of the second liquid storing bag partly contacts the upper surface of the liquid storing part of the first liquid storing bag and the bottom surface;

the lower surface of the liquid storing part of the third liquid storing bag partly contacts the upper surface of the liquid storing part of the second liquid storing bag and the bottom surface; and the lower surface of the liquid storing part of the fourth liquid storing bag partly contacts the upper surface of the liquid storing part of the third liquid storing bag and the bottom surface.

32. The liquid container according to claim 30, wherein:

each of the flexible liquid storing parts of the first, second, third, fourth, fifth and sixth liquid storing bags has an upper surface and a lower surface;

the base defines a bottom surface;

the liquid container further comprises a slope member defining a slope surface inclined relative to the bottom surface;

the lower surface of the liquid storing part of the fifth liquid storing bag partly contacts the slope surface and the bottom surface;

the lower surface of the liquid storing part of the first liquid storing bag partly contacts the upper surface of the liquid storing part of the fifth liquid storing bag and the bottom surface;

the lower surface of the liquid storing part of the second liquid storing bag partly contacts the upper surface of the liquid storing part of the first liquid storing bag and the bottom surface;

the lower surface of the liquid storing part of the third liquid storing bag partly contacts the upper surface of the liquid storing part of the second liquid storing bag and the bottom surface;

the lower surface of the liquid storing part of the fourth liquid storing bag partly contacts the upper surface of the liquid storing part of the third liquid storing bag and the bottom surface; and the lower surface of the liquid storing part of the sixth liquid storing bag partly contacts the upper surface of the liquid storing part of the fourth liquid storing bag and the bottom surface.

* * * * *